Aug. 18, 1942.  B. A. WITTKUHNS  2,293,092
CORRECTION DEVICE FOR GYROSCOPES
Original Filed Aug. 4, 1938  2 Sheets-Sheet 1

INVENTOR
Bruno A. Wittkuhns
BY
Herbert H. Thompson
HIS ATTORNEY

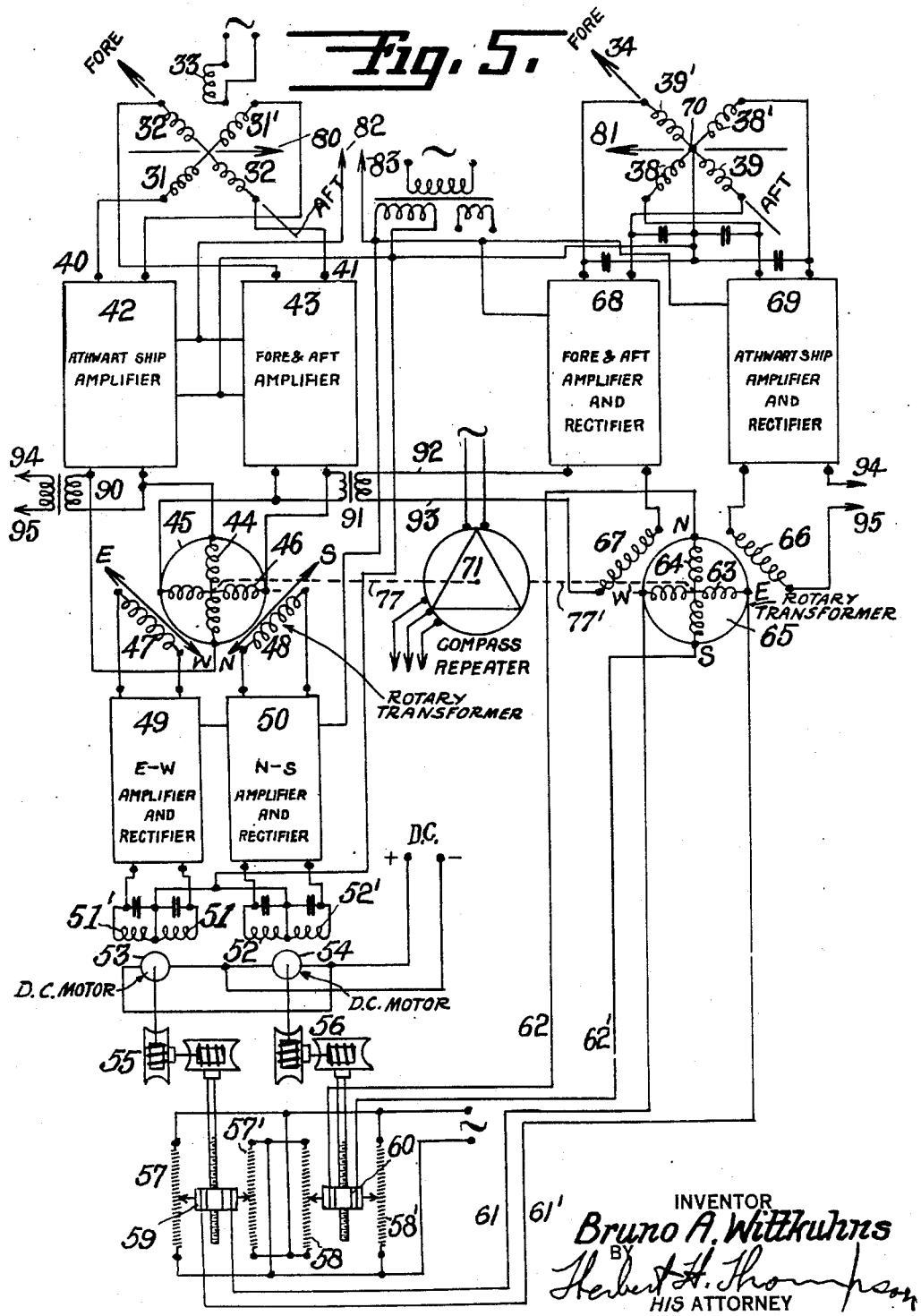

Patented Aug. 18, 1942

2,293,092

UNITED STATES PATENT OFFICE 2,293,092

CORRECTION DEVICE FOR GYROSCOPES

Bruno A. Wittkuhns, Summit, N. J., assignor to Sperry Gyroscope Company, Inc., Brooklyn, N. Y., a corporation of New York Application August 4, 1938, Serial No. 222,984
Renewed April 5, 1940

23 Claims.  (Cl. 33—204)

This invention relates to erection systems for gyroscopes, in general, and more particularly, for gyro verticals used for navigational or gunfire control purposes on board of moving craft.

The principal object of this invention is a novel and improved means for erecting the gyroscope axis to the true vertical.

Another object of the invention is to provide simple automatic means, acting through the erection system, to introduce corrections for latitude and speed errors commonly experienced with gyro verticals of the more accurate type.

A further object of the invention is to provide sensitive means of detecting any departure of the gyroscope axis from the true vertical, and of converting these indications into suitable erecting torques to precess the gyroscope back to its true vertical position.

A further object of this invention is to furnish erecting means for a gyro vertical, which may be controlled and adjusted from the outside without the necessity of touching any of the sensitive parts of the machine. Heretofore, gyro verticals either had manually adjusted correctors for latitude carried on the main gimbal system or on the gravity controlled member, or automatic, power driven correctors of a complicated nature, also mounted directly on the gimbal system, increasing its weight, size and complexity, especially since it was necessary to orient the corrector into a definite and constant relation to the true north, regardless of the turning of the ship, as the latitude error always occurs in the east-west plane. This necessitated the turning of the whole corrector mechanism by means of a compass controlled repeater motor, resulting in many complications.

The present invention obviates this disadvantage by keeping the erection means in a fixed relation to the gyro-vertical axes. The latitude and speed errors are detected in the coordinate system of the gyro vertical, then, outside of the machine, resolved into their east-west and northsouth components, whereupon suitable counter forces to oppose the errors are developed in the east-west-north-south coordinate system. These then are resolved into their components in the axes of the gyro-vertical coordinate system and then applied to the erector on the gyro-vertical structure. This allows the elimination of a great deal of weight and complexity from the gyro-vertical gimbal system and concentrates the whole mechanism of correction and erection outside on a switchboard or the like, together with the coordinate resolving devices, which are oriented by a compass repeater.

In the accompanying drawings,

Fig. 5 is a wiring diagram pertaining to Figs. 1, 3 and 4, showing the component resolving means in a schematic way.

Figure 1:
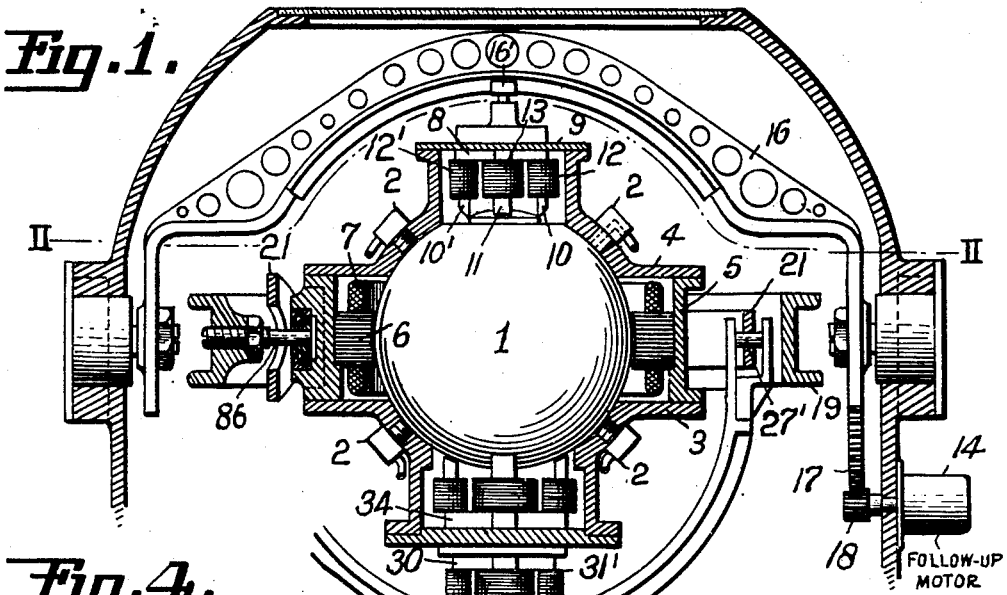
Fig. 1 is a vertical cross section along line I—I of Fig. 2 through a gyro-vertical having a spherical rotor.

In Fig. 1, the spherical rotor 1 of a vertical gyroscope in spinning on air bearings produced by forcing compressed air through the inlets 2 into a narrow spherical air gap between the rotor 1 and the lower cup bearing 3 and the upper cup bearing 4. These cup bearings are mounted on a housing 5 which also contains the stator 6. This stator is used in the conventional way to drive the rotor 1, and its winding 7 may be fed with three-phase alternating current. However, the rotor 1 also could be driven by air from suitable nozzles, or by other well known means. The rotor 1 is preferably balanced in neutral equilibrium so that acceleration forces will not precess the rotor. The housing 5 is carried by a conventional gimbal system, as shown.

A follow-up transformer 8 is mounted on top of the cup 4 by means of plate 9. It has four outer legs 10, 10', 11 and 11', 11' not being shown as it is located directly behind 11 on the far side of the rotor. A center leg (not visible in the drawings) is provided and carries the exciting coil. Each of the four legs 10 and 11 carries coils 12, 12', 13 and 13' respectively (not shown), and all of same are connected in well known manner, as shown in detail in the previous patent to Wittkuhns and Anscott #2,093,503, to two amplifiers (not shown), which, in turn, control the follow-up motors 14 and 15. These motors are controlled according to potentials produced due to misalignment between the top cap of rotor 1 and the follow-up transformer 8, and tend to keep the housing 5, with its cups 3 and 4 and the control transformer 8, lined up with the spin axis of the gyro rotor at all times. Well known means, such as a bail 16 engaging rollers 16' on top of plate 9, and having a gear sector 17 rotated by pinion 18, are provided to line up one axis of the follow-up transformer 8, while an outer gimbal ring 19, having a gear 20, is driven from motor 15 to control the other axis. Ring 19 is supported by pivots 84 and 85, while pivots 86 and 87, projecting through holes in the gimbal ring 21, support housing 5.

An intermediate gimbal ring 21 has pivots 22 and 22', the bearings for which are located in the housing 5 so that the gimbal ring can oscillate around axis 22—22'. In order to simplify the drawings, Fig. 1 is a vertical cross section along the dotted line 23, 24, 25, 26, marked I—I, so that it is possible to show one of the pivots 27, 27' of a pendulum 28 which is suspended on the gimbal ring 21 along an axis at 90° to axis 22—22'. All these axes and the main gimbal axes are intersecting in a common point which is the center of gravity of the sphere 1. It is obvious that the pendulum 28, which carries a round steel armature 29, is entirely independent of the remainder of the gimbal system, so that it can seek the true vertical without being restrained.

Opposite to the armature 29, which is shaped to form a hollow spherical depression on its top, and closely adjacent to it, is mounted a transformer 30 which is similar in every respect to the follow-up transformer 8. It has the same design and tilt detecting purpose as the similar transformer shown in Patent #2,093,503. Its coils 31, 31', 32, 32' (not shown in Fig. 1) are also shown schematically in Fig. 5, which furthermore shows the primary 33 of this transformer, which is not visible in Fig. 1.

Figure 4:
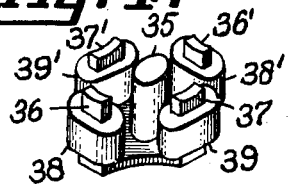
Fig. 4 is a perspective view of the erecting mechanism.

Enclosed within the frame of the lower spherical cup 3 is the erector 34, a perspective view of which is given in Fig. 4. It has a center leg 35 and four outer legs 36, 36', 37, 37'. Each of the four outer legs carries coils 38, 38', 39, 39' respectively. The five legs of this transformer are so arranged opposite to the sphere 1 that a small air gap is maintained between them and the sphere 1, the axis of which normally coincides with the axis of the center leg 35.

The action of the erector depends upon eddy currents generated in the gyro rotor itself. Direct current is supplied to the coils 38, 38' and 39, 39' from rectifiers as described later on, thereby setting up magnetic fields which have the center leg 35 as their common return path after passing through the rotor 1. If each of the coils produces in each of the legs an equal amount of flux, the effect upon the gyro rotor 1 obviously would be only one of retardation or braking. However, the amount of flux is small and therefore the braking effect is negligible. If, now, for some reason the amount of flux in coil 38 should be increased and simultaneously decreased in coil 38', then a larger amount of eddy currents would be acting opposite to leg 36 than opposite to leg 36'. The result would be a drag upon the sphere 1, which is no longer symmetrical to its axis, but deflected toward the leg 36, creating a torque around a horizontal axis of the rotor, which results in precession of the gyro axis in a straight radial line toward the point at which symmetrical drag with respect to its spin axis would be restored. As it is conceivable that the direct current in any of the coils may be changed at will, it is possible to displace the electrical center of symmetry of the eddy currents in any desired direction and to precess the gyro axis in that direction. As the erector, however, has to follow the gyro axis due to the action of the follow-up system, the gyro never reaches the point of balance and precesses at a constant rate proportional to the torque produced by the unbalance in the erector, taking the stabilized system along.

It will be assumed now that the gyro-vertical is placed on a ship in such a way that the plane of the drawing in Fig. 1 intersects the horizontal in a line from north-east to south-west. As is well known, the earth's rotation affects the position of the gyro spin axis in such a way as to apparently tilt the gyro in a counter-clockwise fashion looking north, so that after a short time the gyro axis will have left the true vertical. As the housing 5 and the control transformer 8, by means of the amplifier and follow-up motors 14 and 15, are forced to follow the gyro axis very closely, the whole system slowly wanders off toward the west at the rate of rotation of the earth times the cosine of the latitude of position. Only the pendulum 28 remains truly vertical, and therefore a misalignment will become apparent between the transformer 30 and the weight 29.

According to Fig. 5, coil 33 is supplied with alternating current of commercial frequency and normally excites the coils 31, 31', 32, 32' in opposition to each other in a differential way, so that no potentials appear at the terminals 40 and 41 of the amplifiers 42 and 43. As, however, a misalignment has taken place between transformer 30 and weight 29 in the direction of arrow 80, the coils now are differentially excited so that alternating potentials proportional to the misalignment components appear at terminals 40 and 41 of amplifiers 42 and 43. Amplifier 42 receives an input potential proportional to the tilt component in a plane through the athwartship axis, while amplifier 43 receives a potential according to the tilt component in the fore and aft axis. The output of these amplifiers is amplified A. C. of the same phase and frequency as the inputs and is fed into the rotor windings 44 and 46, respectively, of a rotary transformer 45, as described and shown in detail in Figs. 5 and 6 of U. S. Patent 1,837,292 to A. Richter, or of a component solving device of similar characteristics. The stationary coils 47 and 48 of this transformer are disposed at right angles to each other and have alternating currents induced in them proportional to a function of the angle which the electrical axes of the coils 44 and 46 make with the axis of coils 47 and 48. The relative angular position between the axes of coils 47, 48 and coils 44, 46 is given by the relation of the ship's or gimbal axes with respect to the north-south and east-west directions. This is accomplished by connecting mechanically by a shaft 77 the rotor 45 to the rotor of a self-synchronous repeater 71 which, in turn, is controlled from a transmitter on a gyroscopic compass or similar device. The amplified A. C. output of amplifiers 42 and 43 is also directly transmitted to the amplifiers and rectifiers 68 and 69 by means of transformers 90 and 91, the secondaries of which are in series with the input of amplifiers 68 and 69, respectively. Transformer 91 is connected to amplifier 68 by leads 92 and 93, while transformer 90 feeds into amplifier 69 by leads 94 and 95, shown interrupted for the sake of simplicity.

As explained before, the component potentials induced in coils 47 and 48 are proportional to the relative tilt components of the gyro in the east-west and north-south planes. These potentials are further amplified and rectified in the east-west amplifier 49 and the north-south amplified 50. These amplifiers may be of any suitable well known design as disclosed, for instance, in U. S. Patent 2,064,454 to B. A. Wittkuhns and F. M. Watkins. If the gyro is tilting due west, the resulting field of the rotor coils 44 and 46 would induce potentials in coils 47 only, coil 48 being in the neutral zone, because its electrical axis is at right angles to the resultant electrical axis of coils 44 and 46. Amplifier 50 in that case would receive no signal. If, however, the ship would at that time travel due north or south, a potential proportional to the speed error would be fed into amplifier 50. If the ship travels in a different direction, the tilt will be proportional to the vector sum of latitude and speed error, and the amplifiers 49 and 50 receive the respective component potentials of the total tilt. The output of these amplifiers, after rectification, is fed into the split coils 51, 51' and 52, 52' of direct current motors 53 and 54, respectively. The armatures of these motors may be continuously excited by D. C. and, through reduction gearing 55 and 56, are connected to a pair of double potentiometers 57, 57', 58, 58', the outer ends of which are connected to the same A. C. supply as coil 33. If the sliding contacts of these potentiometers, which are carried on nuts 59 and 60, respectively, are at the exact center of the potentiometers, they touch points of equal potential and therefore the lines 61, 61', 62 and 62' then carry no potential. If, however, for instance, slider 59, by the rotation of motor 53, is moved one way or the other, a variable reversible alternating potential is produced, proportional to the amount of turning of the motor 53. The particular design of motor 53 is such that its speed is substantially proportional to the magnitude of the potential received in coil 47, and it will run as long as there is any signal produced. In this way the motor acts substantially as an integrating device, integrating the magnitude of said potential over the whole time during which it persists, while potentials of short time duration, as may be produced by rolling or pitching of the ship, will be averaged, causing only momentary but no permanent displacements of the nut 59. Therefore the position of the nut 59 and its associated sliders will be determined by the total number of revolutions in one direction made by the motor 53, and the alternating potential derived from potentiometers 57 and 57' is proportional thereto. The same holds true for amplifier 50, motor 54 and nut 60, with its associated sliders.

The two alternating potentials derived from the potentiometers are now carried by lines 61, 61', 62 and 62' to windings 63 and 64, respectively, of a second rotary transformer 65 which is substantially identical in shape and action with rotary transformer 45. The rotor coils of this transformer carry the north-south and east-west alternating potentials which have been determined by motors 54 and 53, respectively. As the rotor 65 is directly coupled by shaft 77' to the self-synchronous repeater motor 71, the rotor will be held in a fixed relation with respect to the north-south direction in space, because the repeater 71 follows a transmitter connected to a ship's compass. It therefore will turn with respect to the ship, or with respect to the stator carrying the stationary coils 66 and 67, whenever the ship turns, through an equal angle but in opposite sense as the ship. The potentials energizing the rotor coils 64 and 63 cause currents to flow through the coils to produce magnetic flux in each, which will combine vectorially into a two-pole flux for the whole rotor. The field vector or axis of this flux is determined by the relative intensity of the currents in the coils so that, if both coils carry equal currents, the resultant flux axis will be located along a line bisecting the angle between the axis of coil 63 and the axis of coil 64. If no current is flowing in coil 63, the resultant flux axis will be in line with the electrical axis of coil 64. Assuming this latter case and assuming further that at a given moment the axis of coil 64 be parallel to the axis of stationary coil 67, then in coil 67 there will be induced a potential equal to that across coil 64, provided the turns ratio of the coils is correctly chosen. Coil 66 will not have any potential induced in its windings as its axis is normal to the axis of coil 64. If the rotor is turned through an increasing angle, the potential in coil 67 will decrease due to the decreasing amount of magnetic linkage between coil 64 and coil 67 and will vary as the cosine of the angle of turn, while simultaneously a potential, increasing as the sine of the angle of turn, will appear across coil 66 until, after 90 degrees of turning, the potential across coil 67 becomes zero and the potential across coil 66 becomes a maximum. If both coils 64 and 63 carry current, their potentials add vectorially and the resultant potential is resolved into two component potentials in coils 66 and 67 according to the sine and cosine of the angular position of the resultant rotor potential vector with respect to the stator. As furthermore coils 66 and 67 are mechanically positioned with their axes parallel to the ship's fore-aft and transverse axis, respectively, coils 66 and 67 resolve the east-west and north-south potentials in coils 63 and 64 into correct components in the ship's or gyro-vertical's fore and aft and athwartship axes, respectively. These potentials, to which part of the outputs of amplifiers 42 and 43 are added by means of transformers 90 and 91, are further amplified and rectified in the amplifiers 68 and 69, from where they emerge as variable reversible direct currents feeding coils 38, 38' and 39, 39', respectively, of the erector 34. The action of the amplifiers 68 and 69 is such that if no signal potential is introduced into their input, an equal amount of static D. C. is flowing through all coils on the erector 34 in the same direction to the common center point 70. If, however, for instance, the amplifier 68 receives an alternating potential in one direction, then the coil 39' might have its D. C. increased while coil 39 has its D. C. decreased, until it completely disappears if the potential from coil 67 has a large enough amplitude. If the potential is reversed, coil 39 receives an increasing amount of D. C., while the flux in coil 39' will gradually disappear.

If the motors 53 and 54 were to be momentarily stopped by interrupting the D. C. supply to their rotors with the nuts 59 and 60 in their neutral position, in which case no alternating potentials are transmitted through lines 61, 61' and 62, 62', the erector coils 38, 38', 39, 39' would be controlled directly by the tilt potentials amplified in amplifiers 42 and 43 and transmitted to amplifier-rectifiers 68 and 69 by transformers 90 and 91. The rotation of the earth will then cause apparent tilt of the gyro rotor and its support until the amplified potentials, caused by such tilt, bias the erector coils sufficiently to stop further tilting of the rotor. The rotor now has its spin axis not in line with the true vertical, but inclined thereto in the east-west plane at an angle proportional to the cosine of the latitude of position.

The motors 53 and 54 perform the function of producing additional continuous bias in the erector to just overcome the persistent tilt of the E—W axis and any persistent tilt in the N—S axis, be it caused by a speed error or by other causes. The motors will continue to run until all tilt potentials in the tilt detector coils 31, 31', 32, 32' have disappeared, and it is therefore evident that motor 53 will run until its total revolutions are substantially proportional to the cosine of the latitude of position. If a suitably graduated scale would be arranged so that a pointer carried by nut 59 would register with the graduations of said scale, the pointer could serve as an approximate indicator of latitude of position, if desired. Once the motors 53 and 54 have settled, there is very little change going to be experienced in their respective outputs, their speeds being preferably so chosen that the rate of change of output potentials from the potentiometers is preferably lower than the rate of change of tilt of the gyro. If this is not done, the precession of the gyro will overshoot the true vertical and a continuous oscillation may result. This fact becomes apparent from the following. Assume that the gyro is on the true vertical and that sliders 59 and 60 are at neutral, no differential output being produced in the erector at that time. The gyro may be one of long recovery time, where the erecting torque produced by the eddy currents of the unbalanced legs of the erector is sufficiently small to cause slow precession, as is desirable for gunnery purposes. Assume a slow tilt due west, starting during to the earth's rotation. The slow tilt in the direction of arrow 80 will immediately produce a potential which, amplified by the amplifiers 42 and 43 and resolved into compass components by transformer 45, will start motor 53 at slow speed, thereby causing slider 59 to produce an alternating potential of slowly increasing amplitude. At the same time a tilt opposing torque has been produced by the direct action of the tilt potentials through amplifiers 42, 43, 68 and 69, at a rate higher than the rate of precession. This results in unbalancing the erector in the direction of arrow 81 to overcome the tilt in the direction of arrow 80.

The immediate result of this unbalance is a slowing up of the rate at which the gyro was precessing away from the vertical. Meanwhile, motor 53 has kept on running, thereby further increasing the unbalance of the erector, until a point is reached at which the precession just stops. If now motor 53 could be stopped, the gyro would permanently stay in that position and the erector would automatically hold it there, provided the ship does not change its position. However, potentials are still present in the tilt detector as long as the gyro is not lined up with the pendulum, so motor 53 keeps on running, further increasing the unbalance in the erector. This results in a slow precession toward the true vertical, at the same time decreasing the potentials fed into amplifiers 42 and 43 and the direct tilt potentials introduced into amplifiers 68 and 69, causing the motor 53 to decrease its speed more and more, the nearer the gyro axis gets to the true vertical. As long as the motor runs, however, the unbalance in the erector keeps on increasing, forcing the gyro to continue its precession toward the vertical. The two potentials influencing the erector act in cooperation, the direct potential, proportional to tilt, decreasing as the gyro approaches the true vertical, the latitude correction potential increasing at a slower and slower rate. At the time the gyro is properly in line with the pendulum and the true vertical, the direct potentials have disappeared and the motor stops, leaving a definite unbalance in the erector sufficient to hold the gyro on the true vertical by precessing it to the vertical at the same rate at which the earth's rotation tends to precess it away. If the motor speed would have been higher, so that the rate of change of unbalance of the erector would have been several times the rate of change of tilt due to the earth's rotation, then the resulting unbalance, which is cumulative, would quickly reach a value to precess the gyro back at high speed, causing overshooting of the mark and resulting in a continuous oscillation of increasing amplitude. If the two rates are alike, a damped oscillation results. But if the motor speed is such that the rate of change of unbalance of the erector is always lower than the rate of change of tilt of the gyro, asymptotic or aperiodic settling is obtained, where the rates of change of position of the gyro axis are so low that no disturbance is created in gunnery apparatus.

At the points 82 and 83 the common A. C. supply for amplifiers 42 and 43 may be interrupted to include a switch adapted to be operated by any of several known types of acceleration indicators. This switch would be normally closed, but would open automatically when a longitudinal or centrifugal acceleration occurs, thereby paralyzing amplifiers 42 and 43 so that no further signals from the tilt detector can influence the position of the sliders 59 and 60 and the excitation of the erector magnets. The torque created in the erector to counteract the latitude tilt remains constant in its magnitude until the disturbance has passed. If the ship turns during that time, the torque vector is rotated by the rotary transformer 65 to maintain its position in space, so that no disturbing error can occur even though the pendulum 28 is aligned with the apparent vertical. The gyro will therefore keep its axis on the true vertical, the whole assembly becoming a system locked in itself, excluding any and all external influences.

Another reason for the slow rate at which nuts 59 and 60 are made to travel is the necessity to bridge the periodic misalignments between pendulum and tilt detector due to roll and pitch of the ship. As the pendulum has a relatively short period, no appreciable effect is produced on the nuts 59 and 60 by its oscillations.

Figure 2:
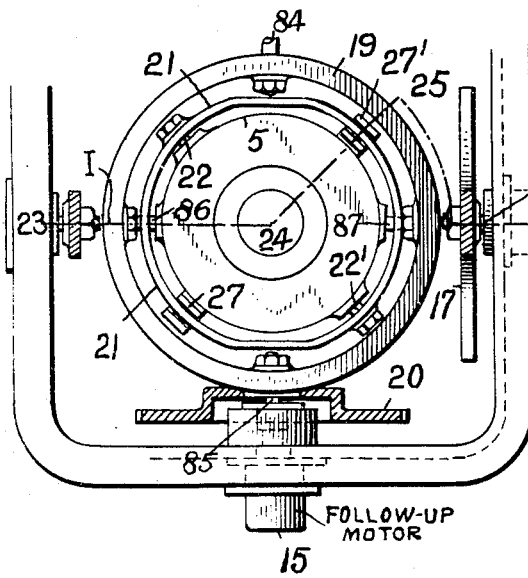
Fig. 2 is a horizontal cross section along line II—II of Fig. 1 through the same instrument on a reduced scale of drawing.
Figure 3:
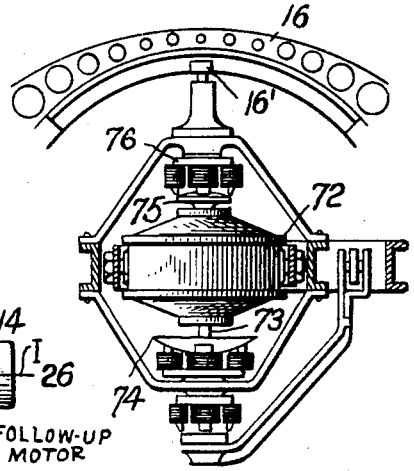
Fig. 3 shows a modification of the invention applied to a conventional gyroscope with a rotor supported on bearings in a case.

Fig. 3 shows a modification of the invention as applied to a conventional gyro having a similar gimbal system so that shown in Figs. 1 and 2, but which has a rotor mounted in bearings in a housing 72, having its shaft 73 projecting through the lower bearing and carrying a spherical disc 74 at the lower end of the shaft. This spherical disc now plays the same role in this type of gyro-vertical as the lower portion of the spherical rotor 1 played in Fig. 1. The disc 74 also may be rotated independently by a separate driving means mounted in or on the housing 72. All connections to the amplifiers, rectifiers, rotary transformers, compass, etc., are identical to those shown in Fig. 5. The control button 75, however, which controls the follow-up transformer 76, is in this case stationary with respect to the housing 72 and does not rotate.

If Fig. 1 or Fig. 3 is turned through an angle of 90°, the gyro would have a horizontal spin axis and the erector would now become a means for controlling the position of the horizontal axis of the gyroscope instead of the vertical axis. No difference in action would be noted. Only the detecting of variations of the position of the gyro rotor with respect to the horizontal would have to be accomplished by a pendulum, the center of gravity of which and the bearings of which would also have to be turned through 90° as compared to Fig. 1.

Anyone skilled in the art will understand that my novel erecting means can be used to control the position of any gyroscope, no matter what the position of its axis in space may be. It has the advantage of allowing complete control of the precession of the gyro axis, no matter what disturbing influences are acting upon the gyro rotor.

As many changes could be made in the above construction and many apparently widely different embodiments of this invention could be made without departing from the scope thereof, it is intended that all matters contained in the above description or shown in the accompanying drawings shall be interpreted as illustrative and not in a limiting sense.

Having described my invention, what I claim and desire to secure by Letters Patent is:

1. In a device for maintaining the vertical position of the spin axis of a gyroscope rotor, means for neutrally and universally supporting said rotor, a plurality of individually excited electromagnets arranged closely adjacent and symmetrically to a pole of said rotor and adapted to create eddy currents in said rotor, thereby applying a torque thereto, follow-up means controlled by said gyro for maintaining the relative position of said magnets with respect to said rotor, gravitational means sensitive to tilt of the rotor axis, and means controlled by said gravitational means adapted to individually vary the flux through said magnets to correct said tilt and to maintain individually different amounts of flux through said magnets responsive to a persisting tendency of the rotor to tilt in one direction.

2. In a gyro vertical, a universally mounted free gyroscope suspended in neutral equilibrium on a gimbal supported frame, means for spinning said gyroscope also supported on said frame, follow-up means controlled by said gyroscope for stabilizing said frame relatively to the spin axis of said gyroscope, gravity controlled means sensitive to tilt of said frame with respect to the true vertical, normally balanced erecting means adapted to apply torques to said gyroscope by generating eddy currents in a part thereof and supported on said frame closely adjacent to said gyroscope, said erecting means being controlled by said gravity means, and means responsive to continued tilt of said frame for cumulatively unbalancing said erecting means to maintain a constant torque upon said gyroscope after the gyroscope becomes vertical.

3. In a ship's gyro-vertical having a rotor, an automatic erecting means therefor, follow-up means controlled by said rotor for stabilizing said erecting means with respect to said rotor, automatic gravity-controlled tilt detecting means adapted to generate initial electrical potentials according to tilt in two component directions in line with and normal to the ship's axis, means for resolving said components into north-south and east-west potential components, means responsive to said north-south and east-west components for generating and maintaining potentials proportional to the time integral of persistent tilt components acting in said last named directions, means for converting said potentials into component potentials along and normal to the ship's axis, and means responsive to said last named component potentials and to said initial electrical potential components adapted to control said erecting means to erect said rotor to the true vertical and to produce and maintain thereafter a torque upon said rotor to cause a continuous precession thereof equal to and opposite to the apparent precession caused by the ship's speed and rotation of the earth.

4. In an automatic latitude corrector for a self-erecting gyroscope having a neutrally mounted rotor suspended on a gimbal frame stabilized with respect to said rotor, an erector comprising a plurality of eddy current producing electromagnets mounted on said frame in close proximity to a spherical portion of said gyroscope and symmetrical to the spin axis of the rotor, means for measuring tilt components due to the earth's rotation in terms of the ship's fore-aft and transverse coordinate systems, first resolving means for resolving said tilt components into other components in terms of a north-south, east-west coordinate system, means responsive to the time integral of the east-west tilt component for obtaining and maintaining a potential proportional to the cosine of latitude of position, second resolving means for resolving said potential into component potentials in terms of said ship's coordinate system, means responsive to the component potentials obtained from said second resolving means for individually varying the current through said electromagnets, and a common means to control both said resolving means from a compass.

5. An erection and correction system for a gyro-vertical having a rotor neutrally and universally supported by a frame stabilized with respect thereto, including a group of individually excited electromagnets adapted to generate torque-applying eddy currents in a part which rotates about the same axis as said rotor, means for detecting tilt components of said frame in two vertical planes containing the ship's longitudinal and transverse axis respectively, and adapted to produce potentials substantially proportional to said tilt components as to sign and amplitude, means external of said gyro-vertical for resolving said potentials into north-south and east-west component potentials substantially proportional to tilt components of said rotor in the north-south and east-west planes, other external means responsive to said north-south and east-west component potentials to obtain and maintain potentials substantially proportional to the time integrals of persistent tilt components in said last named planes, third external means responsive to said first and to said last named component potentials for changing the individual excitations of said electromagnets to apply a tilt opposing torque to said rotor to erect the same to the true vertical, and compass-controlled rotary transformer means for maintaining said torque in a direction substantially fixed in space as said ship turns.

6. In a self-erected gyro-vertical for ships, a rotor neutrally and universally suspended on a gimbaled frame stabilized with respect to said rotor, a normally balanced erector for said rotor on said frame mounted in a fixed relation with respect to the ship's axes, means for measuring tilt components of said frame in terms of the ship's fore-aft and transverse coordinate system, an automatic corrector responsive to said means and external to said gyro-vertical, including means for resolving said tilt components into other tilt components in terms of an external fixed coordinate system, means responsive to said last named components for obtaining tilt opposing component quantities in terms of said last named coordinate system, means for translating said component quantities into other component quantities in terms of the ship's fore-aft and transverse coordinate system, and means for applying said last named component quantities to said erector for biasing said erector in a fixed direction in space to maintain said rotor truly vertical irrespective of the heading of the ship.

7. In a gyro-vertical, a spherical rotor, a frame stabilized thereby and supporting said rotor on air bearings, means supported on said frame for spinning said rotor, a follow-up controller also mounted on said frame opposite and closely adjacent to one pole of said rotor, an electromagnetic eddy current erector mounted also on said frame opposite and closely adjacent to the other pole of said rotor, gravity controlled tilt detecting means also mounted on said frame, and an external automatic corrector responsive to said tilt detecting means, adapted to create and maintain currents in said erector for continuously applying a tilt-opposing torque to said rotor to continuously erect said rotor to the true vertical.

8. In an automatic latitude corrector for a gyro-vertical having a rotor, an erector comprising a plurality of electromagnets for producing eddy currents in a part which tilts with said rotor, means for electrically measuring tilt components of said rotor in terms of the ship's fore-aft and transverse coordinate system, means for electrically resolving said tilt components into components in the east-west and north-south planes, and means for biasing said magnets in response to the persistent east-west tilt component.

9. In an automatic latitude corrector as claimed in claim 8, means responsive to the east-west tilt component adapted to generate a variable reversible potential substantially proportional to the magnitude and sign of said tilt component, integrating means comprising a reversible motor controlled by said potential and adapted to rotate at a speed substantially proportional to the amplitude of said potential, means driven from said motor adapted to produce a voltage proportional to the total number of revolutions of said motor, means for resolving said voltage into component voltages in terms of the ship's fore-aft and transverse coordinate system, means for combining said component voltages with other component voltages proportional to tilt components measured in terms of said ship's coordinate system, and means respnsive to said combined voltages for varying the individual currents through said magnets to precess the rotor to the vertical and for continuously biasing said magnets to maintain thereafter a continuous precession equal and opposite to the effect of the earth's rotation.

10. In a gyro-vertical subject to permanent disturbing forces causing a continuous precession in one plane resulting in a displacement from the vertical, an erector to precess said gyroscope, means responsive to components of said displacement in two mutually perpendicular planes for causing said erector to produce precessing torques upon said gyro proportional and opposite to said tilt, other means also responsive to said displacement components for causing said erector to produce precessing torques on the gyro proportional to the time integral of the displacement, and means to maintain said last named torques for continuously precessing said gyroscope equally and in opposition to said continuous precession when it is vertical.

11. In a gyroscopic apparatus, a free gyroscope, signal producing means operable upon angular departure of the spinning axis of said gyroscope from a reference position for producing a first electrical signal, a second signal producing means controlled by said first signal for obtaining a second electrical signal which is a time integral of said first signal, means for applying a torque to said gyroscope for causing displacement of said axis towards said reference position, and means for controlling said torque means in accordance with both signals, i. e., in accordance with both the angle of departure of said axis and the time integral of said angle.

12. In a gyro vertical, a neutrally mounted gyroscope spinning about a normally vertical axis, gravitationally controlled means for creating an electrical signal upon departure of said axis from the vertical, a second electrical signal producing means controlled by the first means for producing a time integral of said first signal, and means controlled by both signals for applying a precessing torque to said gyroscope causing displacement of said axis toward the vertical, whereby said torque is proportional to the time integral of departure of said axis from the vertical, and drifting of said gyroscope axis from the vertical due to a persistent cause, such as the rotation of the earth, is prevented.

13. Means for coercing a gyroscope to cause it to take up a position of alignment with a controlling body, comprising means for producing a signal proportional in magnitude and equivalent in sign to the amount and direction of deviation of said gyroscope from its position of alignment with said body, a torque applying device for applying a torque to said gyroscope controlled in part by said signal, a second signal producing means controlled by said first signal means for obtaining a time integral of said signal, and means for combining both said signals to control said torque means, whereby the torque applied increases continuously as a deviation persists.

14. Means for coercing a gyroscope as claimed in claim 13, wherein the integrating means comprises a motor which is caused to run continuously in one direction or the other in accordance with the direction of the departure of the gyroscope from its position of alignment, and a controller positioned by said motor for causing said torque applying device to apply a torque which increases with the increasing distance run by the motor.

15. In a gyro vertical, a universally mounted support, power means coupled thereto for controlling the tilt thereof, a gyroscope universally mounted within said support with its spin axis normally vertical, pick-off means between the gyroscope and support for controlling said power means to maintain the former in a predetermined relation to the gyro spin axis, pendulous means universally mounted on said support, pick-off means operating between said pendulous means and support, and an alternating eddy current two-part torque applying device, one part being mounted on said support and the other on said gyroscope and controlled by said pendulous means to maintain the gyroscope erect.

16. In a gyro vertical for moving vehicles, the combination including a support, a gyroscope gimballed thereon having two horizontal gimbal axes, a pendulous device pivoted on said support, a source of electric power, two-part interacting electrical motive means activated by said source, one part being mounted on said gyroscope and the other part on said support, a controller for said motive means connected beadditional alternating current means for applying a weak continuous torque through the aforesaid devices, and means for controlling the strength of said last named means in accordance with a function of the latitude.

19. A gyro vertical as claimed in claim 18 having additional means for resolving the latitude torque into the vertical planes of the gimbal axes of the gyroscopes with reference to a E—W vertical plane and for applying the component torques to the gyroscope.

20. A gyro vertical as claimed in claim 18,